US009137131B1

(12) United States Patent
Sarukkai et al.

(10) Patent No.: US 9,137,131 B1
(45) Date of Patent: Sep. 15, 2015

(54) NETWORK TRAFFIC MONITORING SYSTEM AND METHOD TO REDIRECT NETWORK TRAFFIC THROUGH A NETWORK INTERMEDIARY

(71) Applicant: Skyhigh Networks, Inc., Cupertino, CA (US)

(72) Inventors: Sekhar Sarukkai, Cupertino, CA (US); Kaushik Narayan, San Jose, CA (US); Rajiv Gupta, Los Altos, CA (US)

(73) Assignee: Skyhigh Networks, Inc., Campbell, CA (US)

( * ) Notice: Subject to any disclaimer, the term of this patent is extended or adjusted under 35 U.S.C. 154(b) by 44 days.

(21) Appl. No.: 13/797,634

(22) Filed: Mar. 12, 2013

Related U.S. Application Data

(60) Provisional application No. 61/717,484, filed on Oct. 23, 2013.

(51) Int. Cl.
*G06F 15/173* (2006.01)
*H04L 12/26* (2006.01)
*H04L 29/06* (2006.01)

(52) U.S. Cl.
CPC ............ *H04L 43/0876* (2013.01); *H04L 63/08* (2013.01)

(58) Field of Classification Search
CPC ....... H04L 29/08; H04L 9/32; H04L 43/0876; H04L 63/08
See application file for complete search history.

(56) References Cited

U.S. PATENT DOCUMENTS

| 2005/0021975 | A1* | 1/2005 | Liu ................................. 713/182 |
| 2009/0044280 | A1* | 2/2009 | Wu et al. ........................... 726/26 |
| 2012/0151568 | A1* | 6/2012 | Pieczul et al. ...................... 726/8 |
| 2012/0278487 | A1* | 11/2012 | Woelfel ......................... 709/226 |
| 2013/0139241 | A1* | 5/2013 | Leeder .............................. 726/9 |
| 2013/0219476 | A1* | 8/2013 | Lin et al. ........................... 726/4 |
| 2014/0020072 | A1* | 1/2014 | Thomas ............................ 726/7 |

FOREIGN PATENT DOCUMENTS

WO  WO2012055339  A1 *  5/2012  ....................... 726/4

* cited by examiner

*Primary Examiner* — Andrew Nalven
*Assistant Examiner* — Mary Li
(74) *Attorney, Agent, or Firm* — Van Pelt, Yi & James LLP

(57) ABSTRACT

A network traffic monitoring system for redirecting network traffic between a client device and a cloud service includes a monitor proxy server configured as a network intermediary between the client device and a federated identity provider and between the client device and the cloud service. The monitor proxy server is configured to receive a redirect response generated by the federated identity provider upon user authentication. The monitor proxy server is configured to rewrite the redirect web address to the web address of the monitor proxy server. The monitor proxy server is further configured to rewrite a response web address in network communications between the cloud service and the client device to the web address of the monitor proxy server. As a result, network traffic between the cloud service and the client device is routed through the monitor proxy server after user authentication by the federated identity provider.

13 Claims, 7 Drawing Sheets

NETWORK TRAFFIC MONITORING SYSTEM AND METHOD TO REDIRECT NETWORK TRAFFIC THROUGH A NETWORK INTERMEDIARY

CROSS REFERENCE TO OTHER APPLICATIONS

This application claims priority to U.S. Provisional Patent Application No. 61/717,484 entitled ZERO CLIENT-FOOT-PRINT METHOD AND APPARATUS TO TRANSPARENTLY REDIRECT CLOUD TRAFFIC THROUGH A SERVICE INTERMEDIARY filed Oct. 23, 2012 which is incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

Furthermore, the inherent nature of cloud services being available "anywhere, anytime" presents challenges for an enterprise wishing to monitor its employees' use of various cloud-based services. In particular, the ability of an employee to access cloud services on behalf of the enterprise from outside of the enterprise's private data network makes monitoring the enterprise's cloud traffic difficult and more complex.

For example, cloud-based services include Software-as-a-Service (SaaS) where a specific application or service is offered to a customer as a subscription. Dropbox, Salesforce.com, and QuickBooks are examples of SaaS. An employee of an enterprise may access Salesforce.com on behalf of the enterprise at a location or from a mobile device outside of the enterprise's private data network. In that case, the enterprise is not able to monitor the employee's web activities with the cloud service and cannot apply control over any of the web activities. Meanwhile, the enterprise may be exposed to risks associated with the employee's use of the cloud service.

Traditional approaches to monitoring network traffic include forwarding the network traffic from a firewall to a web proxy, such as by using an IP GRE tunnel (Internet Protocol generic routing encapsulation tunnel). However, network traffic forwarding using this approach only works when the traffic originates from within the enterprise's network boundaries. When network traffic originates from outside the enterprise's private data network, monitoring the traffic becomes more cumbersome, often requiring the traffic to be routed through the enterprise, such as via a virtual private network (VPN).

Another approach to re-route network traffic is to rely on deployment of end-point agents on the client devices used to connect to the cloud service. The end-point agent forces network traffic from the client device to first pass through a proxy service, such as addressed by a web URL, before reaching the target service. However, the enterprise needs to manage all devices that are used by employees to access cloud services to ensure that the proxy or configuration is in effect. The proliferation of mobile devices used by employees in businesses makes the use of end-point agent impractical.

BRIEF DESCRIPTION OF THE DRAWINGS

Various embodiments of the invention are disclosed in the following detailed description and the accompanying drawings.

DETAILED DESCRIPTION

Figure 1:
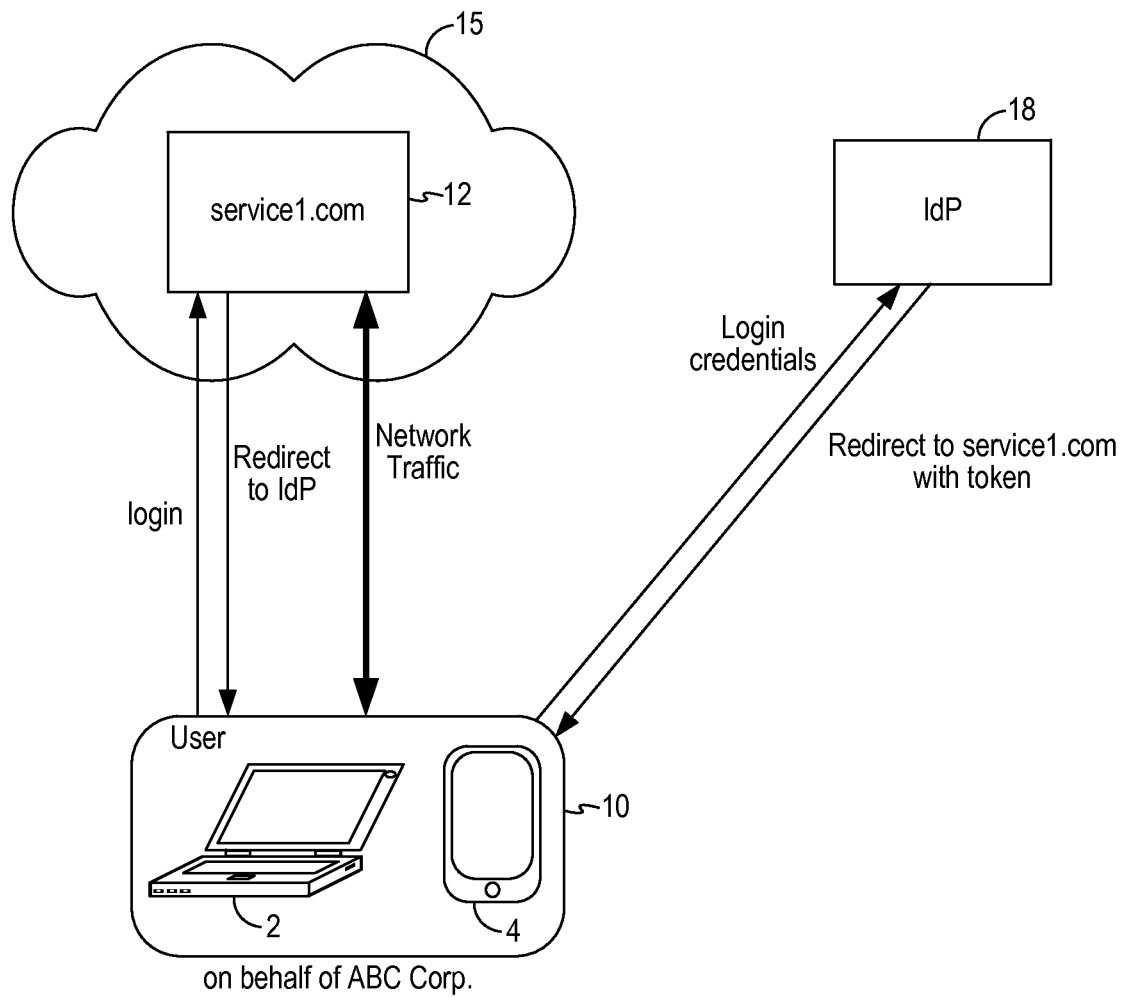
FIG. 1 is a diagram illustrating the network traffic for user access to a cloud service using federated identity management in a conventional setting.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a network traffic monitoring system and method transparently redirects network traffic between a client device and a cloud-based service through a network intermediary without requiring client-side software. In embodiments of the present invention, the network traffic monitoring system and method implements reverse-proxying of the federated identity handshake used to authenticate user access to a cloud-based service. When the user is authenticated, the reverse proxy rewrites the redirect web address for accessing the cloud service so that network traffic between the client device and the cloud service is redirected through a network proxy. In this manner, the network traffic monitoring system and method realizes seamless layering of a network proxy between the client device and the cloud-based service. The network traffic monitoring system and method enables enterprises to gain deep visibility and control over network traffic to/from these cloud-based services that was previously not feasible.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. The network traffic monitoring system and method can be applied in any public or private data network for redirecting traffic between a client device and a cloud service.

In the present description, federated identity management refers to a centralized identity management scheme to enable portability of a user's electronic identity across multiple domains. Federated identity management enables users of one domain to securely access data or systems of another domain seamlessly, without the need for redundant user administration at each of the domains. A part of federated identity management is the Single Sign-On (SSO) scheme. SSO provides access control to multiple independent systems where a user logs in once to gain access to all systems without having to be prompted to log in again at each of the systems. SSO provides the user with a single sign-on token or authentication token which is trusted across multiple domains. A user makes use of the authentication token to gain access to multiple domains, such as cloud services, without further login process. The federated identity management scheme involves three central roles—the user, the service provider from which the user is requesting service, and an identity provider (IdP) which is a trusted provider managing the user's electronic identity and providing user authentication services. Federated identity management, especially web browser SSO, is typically implemented using protocols that provide a standard data format for exchanging authentication and authorization data between an identity provider and a service provider. The service provider receives the user's authentication token and determines if access should be allowed to the user. In embodiments of the present invention, a federated identity provider uses a standard protocol, such as SAML (security assertion markup language) or OpenID, to enable web-based authentication and authorization using federated identity management.

In the present description, a proxy server refers to a server, which can be a computer system or a software application, that acts as an intermediary for requests from clients seeking resources from other servers. Furthermore, in the present description, a reverse proxy server refers to a proxy server that retrieves resources on behalf of a client from one or more servers. These resources are returned to the client as though they originated from the proxy server itself.

FIG. 1 is a diagram illustrating the network traffic for user access to a cloud service using federated identity management in a conventional setting. Referring to FIG. 1, a user, on behalf of an enterprise ABC Corp., wishes to access the services provided by a cloud service 12 ("the service provider"), such as a web application on the website "service1.com." The cloud service 12 is deployed on a data network 15, which can be the Internet or a third-party private data network. The user employs a computing device 10 ("the client device") to connect to the data network 15 to access the services provided by cloud service 12. The computing device 10 may be any computing device capable of connecting to a data network. In the present example, the user may use a laptop computer 2 or a mobile phone 4 to connect to the data network 15.

To request a service from the cloud service 12, the client device 10 initiates a login process to the cloud service (website service1.com). The cloud service 12 implements federated identity management and is configured to verify user credentials using an identity provider (IdP) 18 associated with the enterprise. The cloud service 12 responds to the user login request by redirecting the client device to the enterprise's identity provider (IdP) 18. The client device 10 then communicates with the identity provider 18 to complete the authentication process. To authenticate the user, the identity provider may request information from the user, such as a user name and password. The client device 10 provides login credentials (e.g. user name and password) to the identity provider 18. The identity provider 18 authenticates the user and redirects the user back to the cloud service 12 (service1.com) with an identity assertion, or an authentication token. The user provides the authentication token to the cloud service 12. On the basis of the identity assertion or the authentication token provided by the identity provider to the user, the service provider makes an access control decision to allow or disallow access by the user. When the service provider validates the token, the user may then access the services provided by the cloud service. Network traffic flows between the cloud service 12 and the client device 10.

When client device 10 accesses cloud service 12 from within the private data network of ABC Corp., the network traffic between the client device 10 and the cloud service 12 may be monitored by security devices installed at the entry point to the private data network, such as a firewall. However, when client device 10 accesses cloud service 12 from outside the private data network of ABC Corp., the enterprise has limited or no ability to monitor the network traffic and the enterprise has limited or no ability to apply security control.

Figure 2:
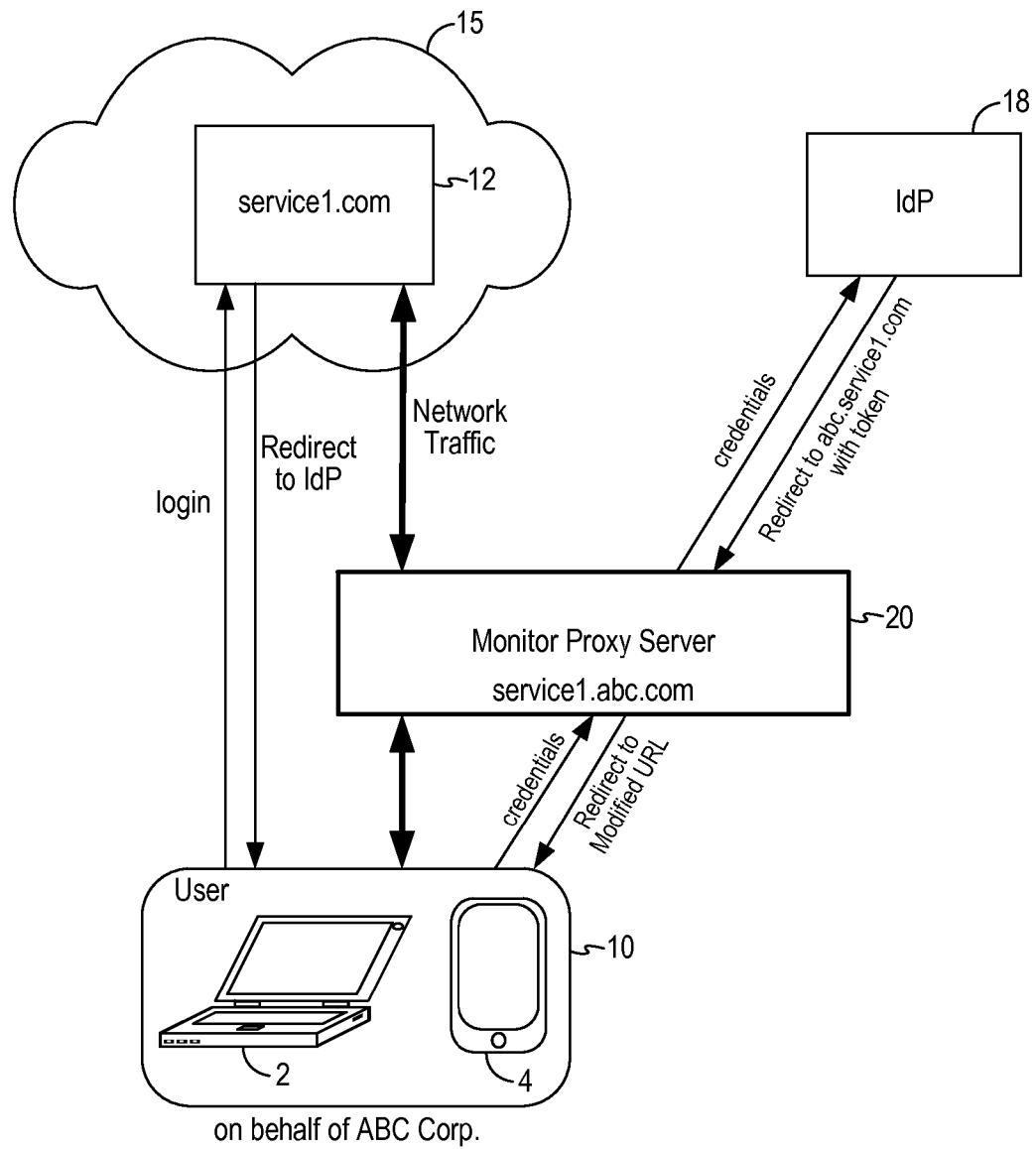
FIG. 2 is a diagram illustrating a network traffic monitoring system to redirect network traffic in embodiments of the present invention.

FIG. 2 is a diagram illustrating a network traffic monitoring system to redirect network traffic in embodiments of the present invention. Referring to FIG. 2, a network traffic monitoring system 20 is implemented as a proxy server acting as a network intermediary between the client device 10 and the enterprise's identity provider 18 as well as the cloud service 12. The proxy server is referred to as the "monitor proxy server" in the present description. In the example shown in FIG. 2, the cloud service 12 provides services requested by the user and the identity provider 18 implements federated identity management for the enterprise (e.g. ABC Corp.). Identity provider 18 is sometimes referred to as a federated identity provider for maintaining federated identity information on behalf of an enterprise. A salient feature of the network traffic monitoring system 20 is that no client agent or client software is required. The user may employ any computing device as the client device 10 and no special configuration is required on the client device to implement the network traffic monitoring system and method. Furthermore, the network traffic monitoring system 20 transparently and seamlessly redirect network traffic between the client device and the cloud service without the need to route traffic through a VPN.

The network traffic monitoring system 20 operates as follows. A user, on behalf of an enterprise ABC Corp., wishes to access the services provided by the cloud service 12 ("the service provider"), such as a web application on the website "service1.com." The cloud service 12 is deployed on the data network 15, which can be the Internet or a third-party private data network or the private data network of the enterprise. The user employs a computing device 10 ("the client device") to connect to the data network 15 to access the services provided by cloud service 12. The computing device 10 may be any computing device capable of connecting to a data network. In the present example, the user may use a laptop computer 2 or a mobile phone 4 to connect to the data network 15. In other examples, the user may use a desktop computer or a tablet computer. The user may access data network 15 from within the private data network of the enterprise ABC Corp., or from outside the private data network of the enterprise.

To request a service from the cloud service 12, the client device 10 initiates a login process to the cloud service ("service1.com") as is conventionally done. The cloud service 12, implementing federated identity management, responds to the user login request by redirecting the client device to an identity provider (IdP) 18 associated with the enterprise. Since the federated identity management service is dependent on the enterprise identity (e.g. ABC Corp.), the cloud service 12 can be preconfigured to direct all login requests for a particular enterprise (ABC Corp.) to the monitor proxy server 20. In one embodiment, the redirect of login requests for each enterprise is implemented in a domain name server which resolves the domain name of the enterprise's identity provider 18 to the IP address of the monitor proxy server 20 (for example, "service1.abc.com"). In this manner, when the client device 10 initiates a login request to the cloud service on behalf of ABC Corp., the client device 10 will be redirected to the monitor proxy server 20 which routes the session onto the identity provider 18. In on embodiment, the monitor proxy server 20 acts as a reverse proxy for the client device 10.

The client device 10 then communicates with the identity provider 18, through the monitor proxy server 20, to complete the authentication process. To authenticate the user, the identity provider may request information from the user, such as a user name and password. The client device 10 provides login credentials (e.g. user name and password) to the monitor proxy server 20 which forwards the credentials to the identity provider 18. The identity provider 18 authenticates the user and responds with a redirect response containing a redirect web address, typically in the form of an URL (uniform resource locator), to redirect the user back to the cloud service 12 (e.g., abc.service1.com). The redirect web address includes an identity assertion, or an authentication token, which is used by the service provider to validate the user authentication.

The redirect web address sent by the identity provider 18 is received by the monitor proxy server 20. The monitor proxy server 20 intercepts the redirect response and rewrites the redirect web address to be the web address of the monitor proxy server 20 (e.g., service1.abc.com), which will serve as the network intermediary between the client device and the cloud service. The rewritten web address and the authentication token is then provided to the client device 10. All subsequent accesses to the cloud service 12 from the client device 10 are then routed through the monitor proxy server 20 which functions as a reverse proxy for the client device. The client device 10 requests resources from the cloud service 12 through the monitor proxy server 20 and the monitor proxy server 20 retrieves the resources on behalf of the client device 10 from the cloud service 12. The retrieved resources are provided to the client device 10 as though they originate from the monitor proxy server itself.

During a connection session, the monitor proxy server continuously rewrites the response web address in network communications received from the client server 10 and the cloud service 12 so that network traffic (requests and responses) between the cloud service and the client server is directed through the monitor proxy server 20, without the client device 10 or the cloud service 12 being aware of the presence of the monitor proxy server 20. For instance, the monitor proxy server 20 rewrites the response web address in a response from the cloud service 12 to the client device 10 by replacing the response web address of the cloud service (abc.service1.com) with the address of the monitor proxy server (service1.abc.com). When the response is forwarded to the client device 10, the client device will make future requests to the cloud service 12 using the rewritten response web address, which is the address of the monitor proxy server (service1.abc.com).

Accordingly, the network traffic monitoring system of the present invention implements seamless steering of network traffic (requests and responses) between a client device and a cloud service by rewriting the redirect web address from the federated identity provider and by reverse proxying subsequent access to the cloud service. The enterprise is then able to seamlessly manage network traffic from a client device of its employee to a cloud service, even when the employee is outside of the private data network of the enterprise. The enterprise is able to obtain deep visibility and control of all traffic to the cloud service from a client device which may be acting on behalf of the enterprise.

In the above described embodiment, the monitor proxy server 20 provides the authentication token generated by the identity provider 18 to the client device 10 which then uses the token to gain access to the cloud service 12. In some embodiments of the present invention, the monitor proxy server 20 encrypts the authentication token before the token is provided to the client device. The client device 10 receives an encrypted authentication token w prevent the user from accessing the same cloud service or a different cloud service through an alternate connection session that bypasses the monitor proxy server. The monitor proxy server 20, when communicating with the cloud service 12 on behalf of the client device 10, provides the original authentication token of the user or a decrypted authentication token to the cloud service for access control determination.

Figure 3:
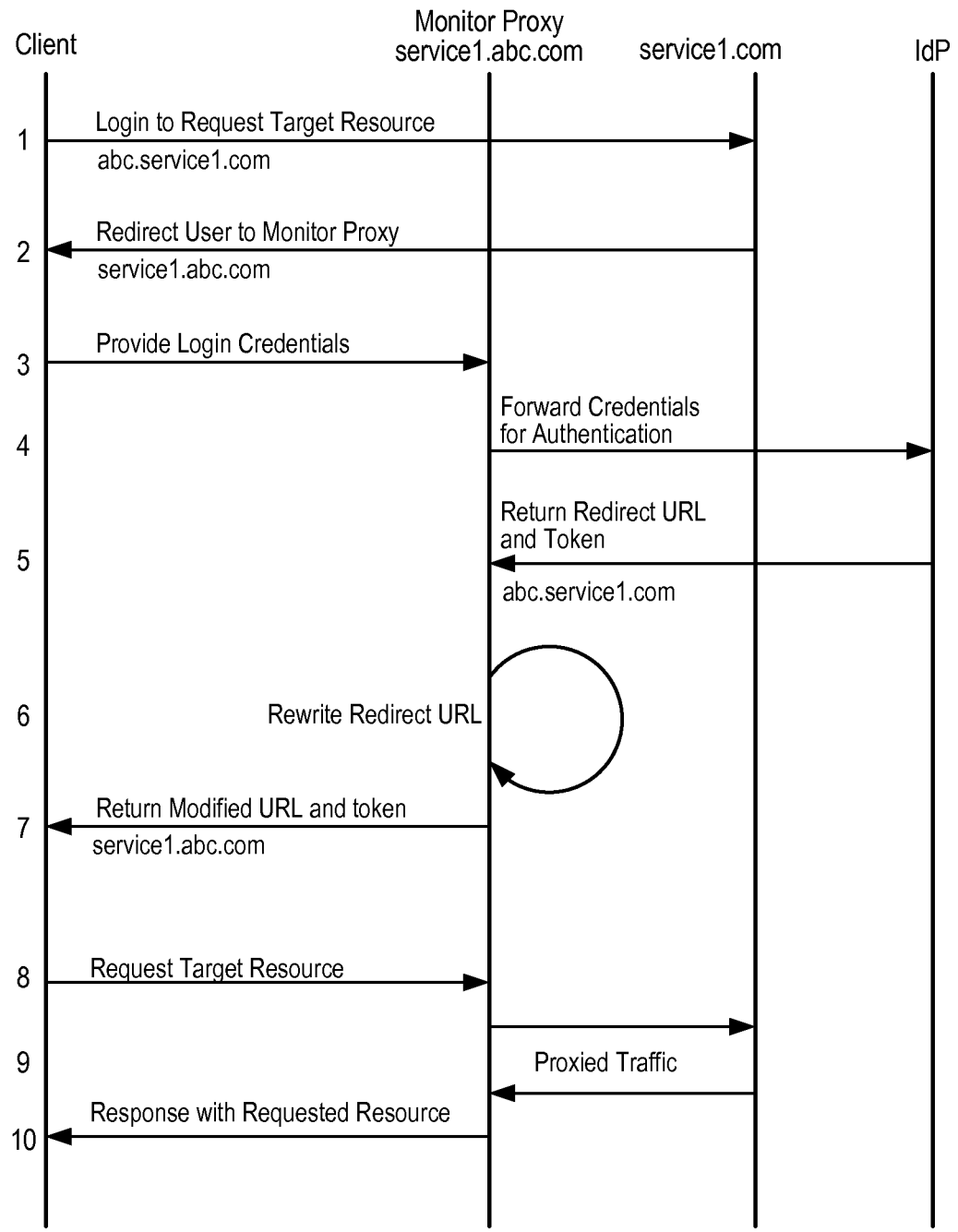
FIG. 3 illustrates the protocol flow for the network traffic monitoring system of FIG. 2 in embodiments of the present invention.

FIG. 3 illustrates the protocol flow for the network traffic monitoring system of FIG. 2 in embodiments of the present invention. Referring to FIG. 3, at 1, a user using a client device accesses a cloud service on behalf of an enterprise ABC Corp. using the cloud service's web address "service1.com". The client device may be any computing device (e.g. laptop computer or mobile device) and may be located internal or external to the enterprise's private data network. In one example, the client device accesses the cloud service's web address using a web browser application.

At 2, the cloud service implements federated identity management and is preconfigured to verify the user credentials using an identity provider (IdP) associated with the enterprise. Since the identity provider is dependent on the enterprise identity (e.g. ABC Corp.), the cloud service (service1.com) is preconfigured to direct users from ABC Corp. to authenticate with an identity provider IdP specified by the enterprise, where the redirecting of the client device to the enterprise's identity provider resolves to a monitor proxy server. To that end, the cloud service returns the web address, or the URL, of the monitor proxy server (service1.abc.com) to the client device.

At 3, in response to the identity provider challenging the user for the login credentials, the client device provides login credentials to the monitor proxy server which forwards the login credentials to the enterprise identity provider (4). When the user is successfully authenticated at the identity provider, the identity provider responds with a redirect response containing a redirect web address, such as a redirect URL, to the cloud service (abc.service1.com) along with an authentication token (5).

At 6, the monitor proxy server intercepts the redirect response and rewrites the redirect web address to a domain that resolves to the monitor proxy server (service1.abc.com). At 7, the rewritten web address (service1.abc.com) and the authentication token are forwarded to the client device. In one embodiment, the authentication token is encrypted. At 8-10, the client device, upon receipt of the modified redirect web address, connects to the rewritten domain—the monitor proxy server—as if it is connecting to the cloud service. The monitor proxy server functions as a reverse proxy for the client device and routes network traffic between the cloud service and the client device. As thus configured, all requests from the client device are routed to the monitor proxy server which then forwards the requests to the cloud service with the authentication token. In one embodiment, the monitor proxy server provides the original unencrypted authentication token or a decrypted authentication token to the cloud service. All responses from the cloud services to the client device also flow through the monitor proxy server. The monitor proxy server continuously rewrites the response web addresses to the web address of the monitor proxy server (service1.abc.com) in all communications between the cloud service and the client device.

In the above-described embodiments, the network traffic monitoring system is implemented in a monitor proxy server, which can be a single physical server or a single logical server. In other embodiments of the present invention, the monitor proxy server can be implemented as two logical servers or two physical servers. The exact configuration of the monitor proxy server is not critical to the practice of the present invention.

Figure 4:
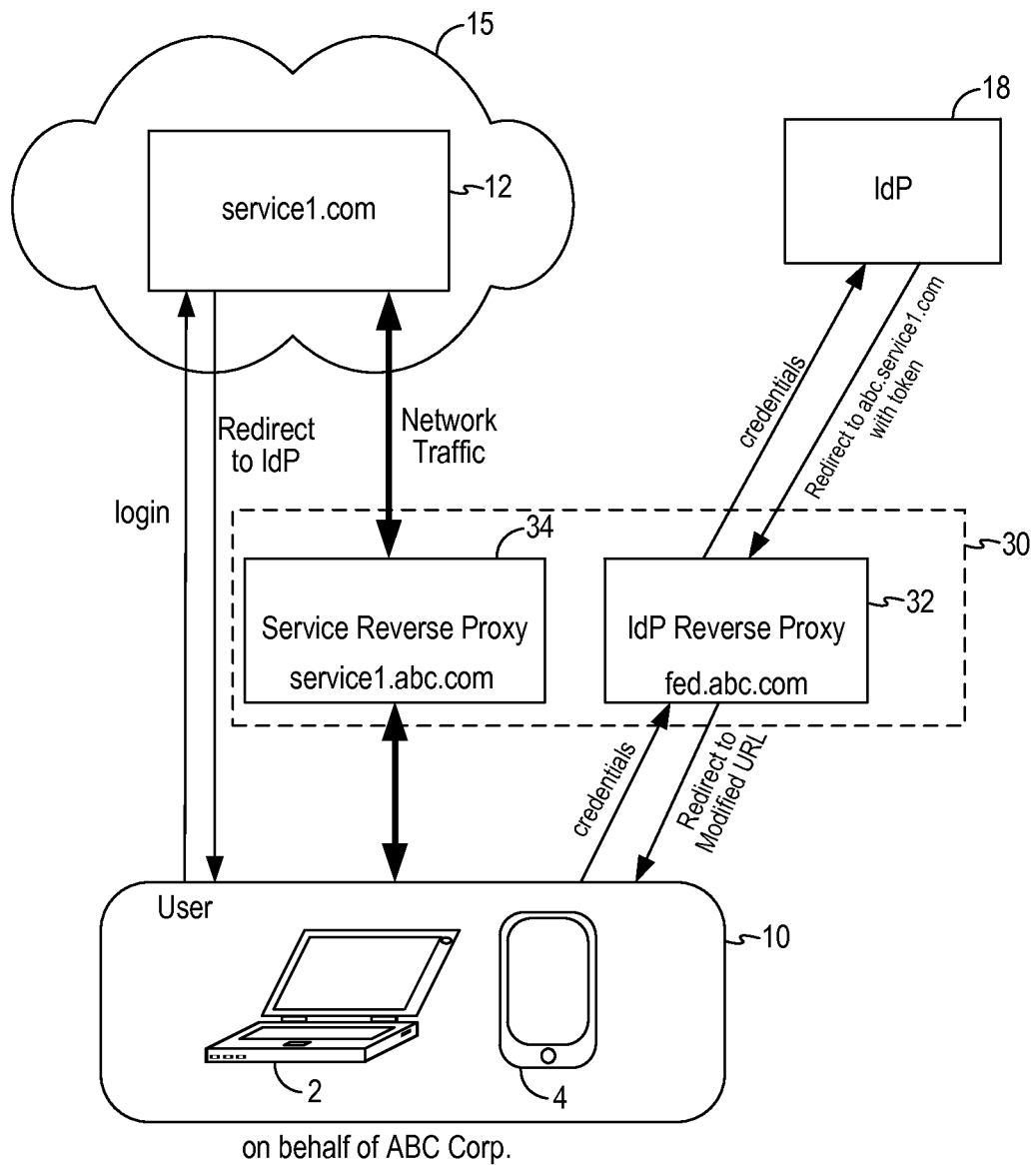
FIG. 4 is a diagram illustrating a network traffic monitoring system to redirect network traffic in alternate embodiments of the present invention.

FIG. 4 is a diagram illustrating a network traffic monitoring system to redirect network traffic in alternate embodiments of the present invention. Like elements in FIGS. 2 and 4 are given like reference numerals and will not be described in detail. Referring to FIG. 4, a network traffic monitoring system 30 is implemented as two reverse proxy servers which can be two physical servers or two logical servers. In particular, the network traffic monitoring system 30 includes a first reverse proxy server 32 acting as a network intermediary between the client device 10 and an identity provider 18 and a second reverse proxy server 34 acting as a network intermediary between the client device 10 and the cloud service 12. In the present description, the first reverse proxy server 32 is also referred to as the identity provider (IdP) reverse proxy server and the second reverse proxy server 34 is also referred to as the service reverse proxy server. In the example shown in FIG. 4, the cloud service 12 provides services requested by the user and the identity provider 18 provides federated identity management for an enterprise.

The network traffic monitoring system 30 operates as follows. A user, on behalf of an enterprise ABC Corp., wishes to access the services provided by the cloud service 12 ("the service provider"), such as a web application on the website "service1.com." The cloud service 12 is deployed on the data network 15, which can be the Internet or a third-party private data network. The user employs a computing device 10 ("the client device") to connect to the data network 15 to access the services provided by cloud service 12. To request a service from the cloud service 12, the client device 10 initiates a login process to the cloud service ("service1.com") as is conventionally done. The cloud service 12, implementing federated identity management, responds to the user login request by redirecting the client device to an identity provider (IdP) 18 associated with the enterprise. More specifically, the cloud service 12 is configured to direct all login requests for a particular enterprise (ABC Corp.) to the IdP reverse proxy server 32. In one embodiment, the redirect of login requests for each enterprise is implemented in a domain name server which resolves the domain name for the identity provider to the IP address of the IdP reserve proxy server 32 (for example, "fed.abc.com"). In this manner, when the client device 10 initiates a login request to the cloud service on behalf of ABC Corp., the client device 10 will be redirected to the IdP reverse proxy server 32 which routes the session onto the identity provider 18.

The client device 10 then communicates with the identity provider 18, through the IdP reverse proxy server 32, to complete the authentication process. To authenticate the user, the identity provider may request information from the user, such as a user name and password. The client device 10 provides login credentials (e.g. user name and password) to the IdP reverse proxy server 32 which forwards the credentials to the identity provider 18. The identity provider 18 authenticates the user and responds with a redirect response containing a redirect web address, or a redirect URL, to redirect the user back to the cloud service 12 (e.g., abc.service1.com). The redirect web address includes an identity assertion, or an authentication token, which is used by the service provider to validate the user authentication.

The redirect web address sent by the identity provider 18 is received by the IdP reverse proxy server 32. The IdP reverse proxy server 32 intercepts the redirect response and rewrite the redirect web address to be the web address of the service reverse proxy server 34 (service1.abc.com), which will serve as the network intermediary between the client device and the cloud service. The rewritten web address with the authentication token is then provided to the client device 10. In one embodiment, the IdP reverse proxy server 32 encrypts the authentication token and provides an encrypted token to the client device. All subsequent accesses to the cloud service 12 from the client device 10 are then routed through the service reverse proxy server 34 which functions as a reverse proxy for the cloud service. During a connection session, the service reverse proxy server 34 continuously rewrites the response web address for communications received from the client server 10 and the cloud service 12 so that the network traffic (requests and responses) between the cloud service and the client server is directed through to the service reverse proxy server 34, without the client device 10 or the cloud service 12 being aware of the service reverse proxy server.

Figure 5:
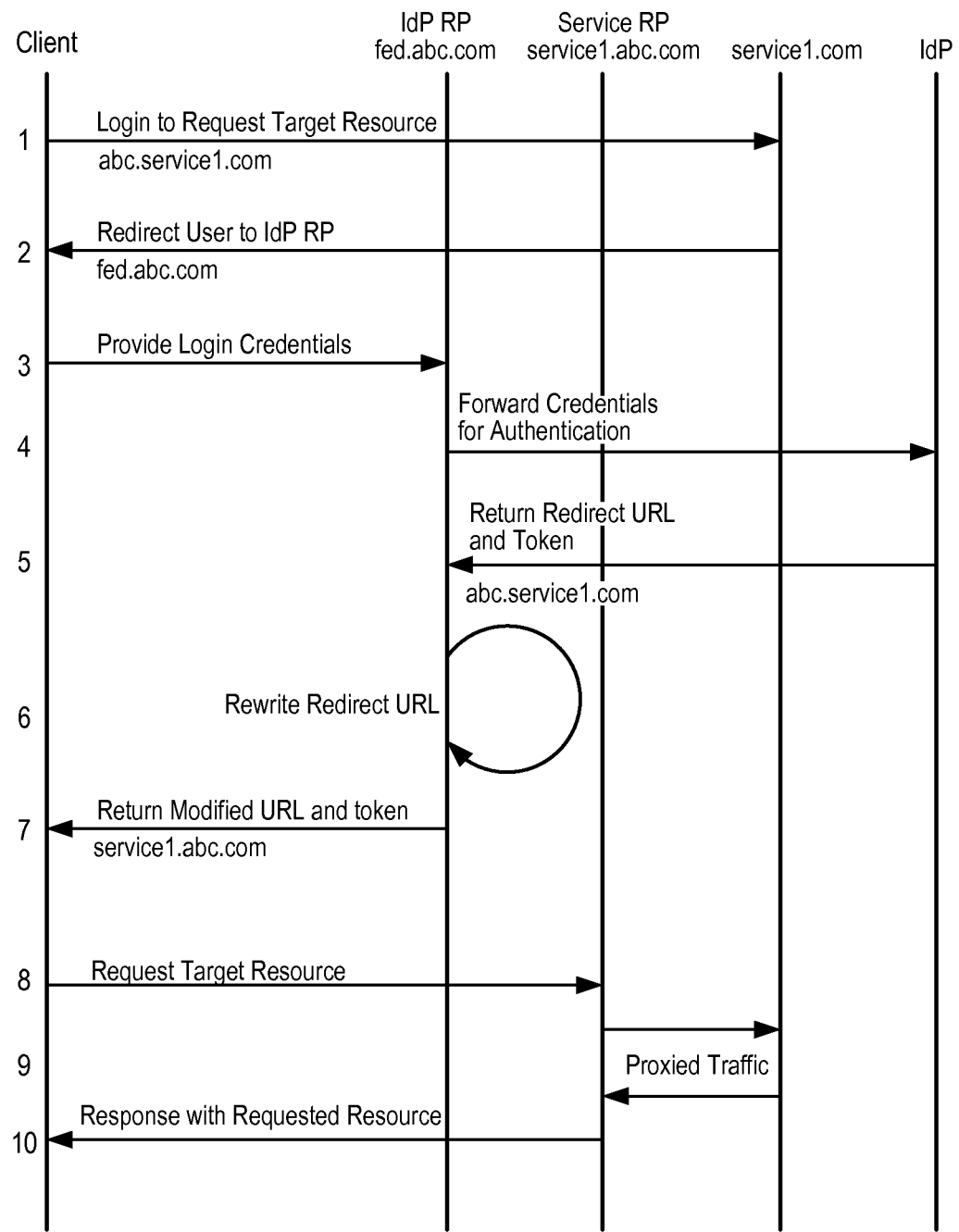
FIG. 5 illustrates the protocol flow for the network traffic monitoring system of FIG. 4 in embodiments of the present invention.

FIG. 5 illustrates the protocol flow for the network traffic monitoring system of FIG. 4 in embodiments of the present invention. Referring to FIG. 5, at 1, a user using a client device accesses a cloud service on behalf of an enterprise ABC Corp. using the cloud service's web address "service1.com". The client device may be any computing device (e.g. laptop computer or mobile device) and may be located internal or external to the enterprise's private data network. In one example, the client device accesses the cloud service's web address using a web browser application.

At 2, the cloud service implements federated identity management and is preconfigured to verify the user credentials using an identity provider (IdP) associated with the enterprise. Since the identity provider is dependent on the enterprise identity (e.g. ABC Corp.), the cloud service (service1.com) is preconfigured to direct users from ABC Corp. to authenticate with an identity provider IdP specified by the enterprise, where the redirecting of the client device to the enterprise's identity provider resolves to a monitor proxy server. To that end, the cloud service returns the web address, or the URL, of the identity provider reverse proxy server (fed.abc.com) to the client device.

At 3, in response to the identity provider challenging the user for the login credentials, the client device provides login credentials to the identity provider reverse proxy server which forwards the login credentials to the enterprise identity provider (4). When the user is successfully authenticated with the identity provider, the identity provider responds with a redirect response containing a redirect web address, such as a redirect URL, to the cloud service (abc.service1.com) along with an authentication token (5).

At 6, the identity provider reverse proxy server intercepts the redirect response and rewrites the redirect web address to a domain that resolves to a service reverse proxy server (service1.abc.com). At 7, the rewritten web address (service1.abc.com) and the authentication token are forwarded to the client device. In one embodiment, the authentication token is encrypted. At 8-10, the client device, upon receipt of the modified web address, connects to the rewritten domain—the service reverse proxy server—as if it is connecting to the cloud service. The service reverse proxy server functions as a reverse proxy for the cloud service and routes network traffic between the cloud service and the client device. As thus configured, all requests from the client device are routed to the service reverse proxy server which then forwards the requests to the cloud service with the authentication token. In one embodiment, the service reverse proxy server provides the original unencrypted authentication token or a decrypted authentication token to the cloud service. All responses from the cloud services to the client device also flow through the service reverse proxy server. The service reverse proxy server continuously rewrites the response web address to the web address of the service reverse proxy server (service1.abc.com) in all communications between the cloud service and the client device.

In alternate embodiments of the present invention, a user may login to an identity provider directly or to an enterprise application distribution platform configured to provide users with access to application software to which the users are entitled. The network traffic monitoring system can be applied in such scenarios to redirect network traffic through a network intermediary.

Figure 6:
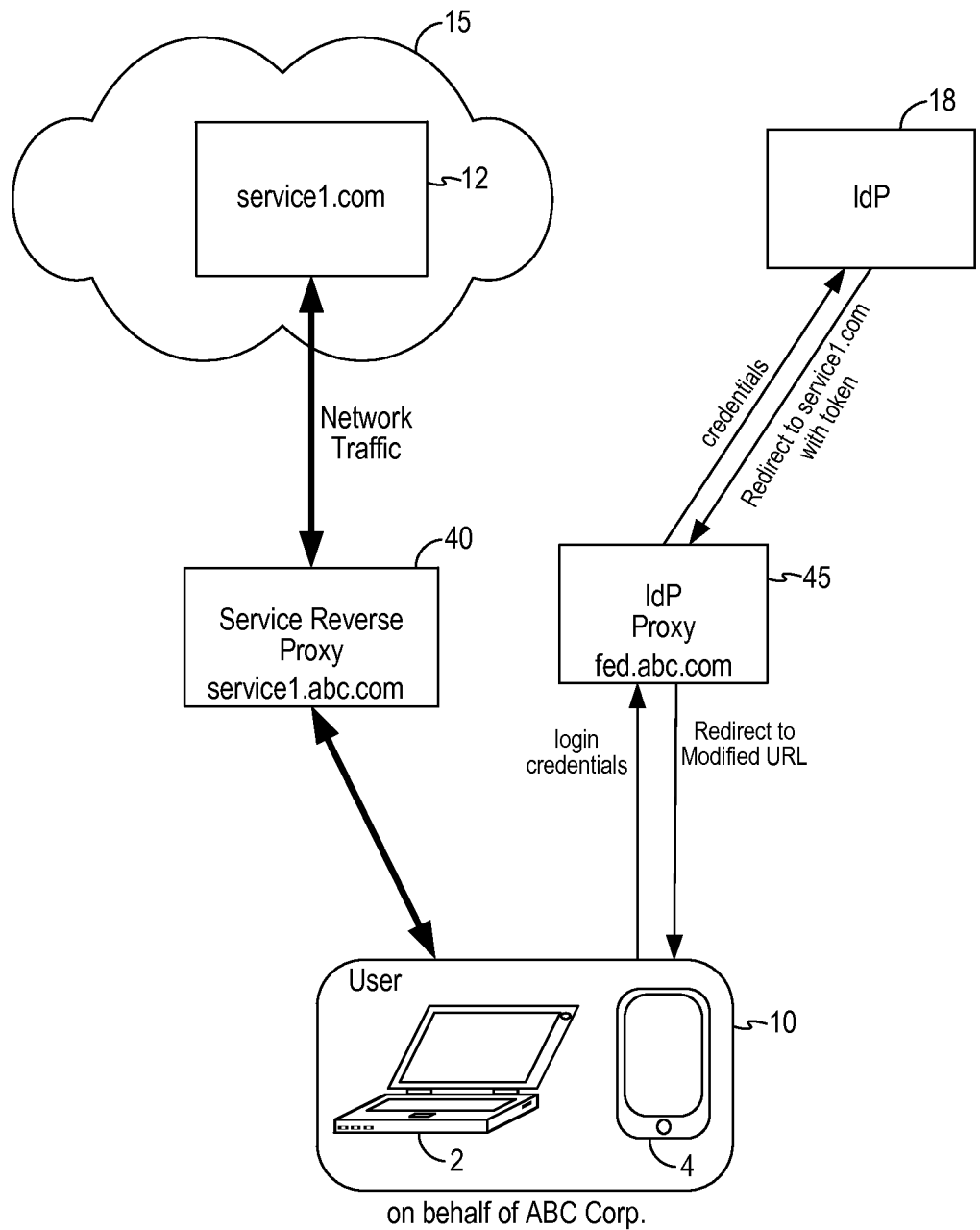
FIG. 6 is a diagram illustrating a network traffic monitoring system to redirect network traffic in alternate embodiments of the present invention.

FIG. 6 is a diagram illustrating a network traffic monitoring system to redirect network traffic in alternate embodiments of the present invention. Referring to FIG. 6, an enterprise uses a published identity provider or an enterprise application distribution platform to provide users with access to one or more cloud services. In the present illustration, a cloud service 12 is an example of cloud services provided to users of an enterprise (e.g. ABC Corp.). The published identity provider is configured to authenticate users using an identity provider 18 associated with the enterprise. The identity provider 18 provides federated identity management for the enterprise in relation to using the one or more cloud services. In the present illustration, the published identity provider is implemented as an identity provider proxy server 45. The identity provider proxy server 45 is configured to act as a proxy that verifies user credentials using the identity provider 18 associated with the enterprise. In embodiments of the present invention, a network traffic monitoring system 40 is implemented as a service reverse proxy server acting as a network intermediary between a client device 10 and the cloud service 12.

The network traffic monitoring system 40 operates as follows. A user, on behalf of an enterprise ABC Corp., wishes to access the services provided by the cloud service 12 ("the service provider"), such as a web application on the website "service1.com." The cloud service 12 is deployed on the data network 15, which can be the Internet or a third-party private data network. The user employs a computing device 10 ("the client device") to connect to the data network 15 to access the services provided by cloud service 12. To request a service from the cloud service 12, the client device 10 initiates a login process to the identity provider proxy server 45 (e.g. "fed.abc.com") as a means to authenticate the user before accessing the cloud service.

The client device 10 communicates with the identity provider 18, through the identity provider proxy server 45, to complete the authentication process. To authenticate the user, the identity provider 18 may request information from the user, such as a user name and password. The client device 10 provides login credentials (e.g. user name and password) to the identity provider proxy server 45 which forwards the credentials to the identity provider 18. The identity provider 18 authenticates the user and responds with a redirect response containing a redirect web address, or a redirect URL, to redirect the user back to the cloud service 12 (e.g., abc.service1.com). The redirect web address includes an identity assertion, or an authentication token, which is used by the service provider to validate the user authentication.

The redirect web address sent by the identity provider 18 is received by the identity provider proxy server 45. The identity provider proxy server 45 intercepts the redirect response and rewrites the redirect web address to be the web address of the service reverse proxy server 40 (service1.abc.com), which will serve as the network intermediary between the client device and the cloud service. The rewritten web address with the authentication token is then provided to the client device 10. All subsequent accesses to the cloud service 12 from the client device 10 are then routed through the service reverse proxy server 40 which functions as a reverse proxy for the client device. During a connection session, the service reverse proxy server 40 continuously rewrites the response web address for communications received from the client server 10 and the cloud service 12 so that the network traffic (requests and responses) between the cloud service and the client server is directed through to the service reverse proxy server 40, without the client device 10 or the cloud service 12 being aware of the service reverse proxy server.

Figure 7:
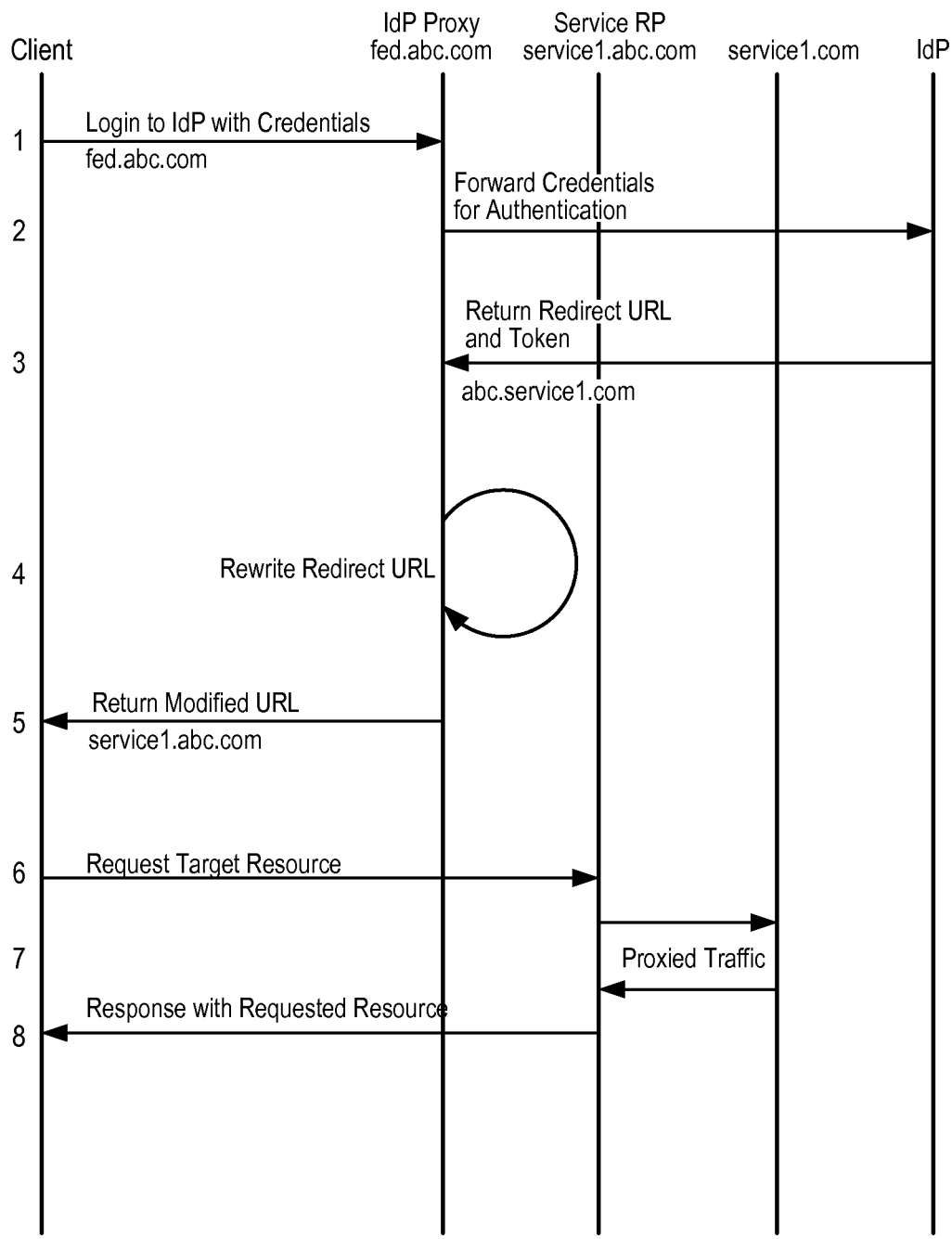
FIG. 7 illustrates the protocol flow for the network traffic monitoring system of FIG. 6 in embodiments of the present invention.

FIG. 7 illustrates the protocol flow for the network traffic monitoring system of FIG. 6 in embodiments of the present invention. Referring to FIG. 7, at 1, a user using a client device to access a cloud service on behalf of an enterprise ABC Corp. first login to an identity provider proxy server using the proxy's web address "fed.abc.com". The client device may be any computing device (e.g. laptop computer or mobile device) and may be located internal or external to the enterprise's private data network. In one example, the client device accesses the cloud service's web address using a web browser application.

At 2, the identity provider proxy server forwards the login credential of the user to an identity provider associated with the enterprise. When the user is successfully authenticated with the identity provider, the identity provider responds with a redirect response containing a redirect web address, or a redirect URL, to the cloud service (abc.service1.com) along with an authentication token (3).

At 4, the identity provider proxy server intercepts the redirect response and rewrites the redirect web address to a domain that resolves to a service reverse proxy server (service1.abc.com). At 5, the rewritten web address (service1.abc.com) and the authentication token are forwarded to the client device. In one embodiment, the authentication token is encrypted. At 6-8, the client device, upon receipt of the modified web address, connects to the rewritten domain—the service reverse proxy server—as if it is connecting to the cloud service. The service reverse proxy server functions as a reverse proxy for the client device and routes network traffic between the cloud service and the client device. As thus configured, all requests from the client device are routed to the service reverse proxy server which then forwards the requests to the cloud service with the authentication token. In one embodiment, the service reverse proxy server provides the original unencrypted authentication token or a decrypted authentication token to the cloud service. All responses from the cloud services to the client device also flow through the service reverse proxy server. The service reverse proxy server continuously rewrite the response web addresses to the web address of the service reverse proxy server (service1.abc.com) in all communications between the cloud service and the client device.

In embodiments of the present invention, the monitor proxy server, including the service reverse proxy server and the identity provider reverse proxy server, can be installed in the private data network of the enterprise or the monitor proxy server can be installed in the publicly available Internet. Alternately, the monitor proxy server can be installed in a third party private data network. Similarly, the identity provider proxy server can be installed in the private data network of the enterprise, in the publicly available Internet, or in a third party private data network.

In the above-described embodiments, the network traffic monitoring system and method rewrites the redirect web address to redirect network traffic to a network intermediary so that the network traffic can be monitored. In alternate embodiments of the present invention, the network traffic monitoring system and method intercepts the redirect response from the federated identity provider and generates a response to the client device with a HTTP redirect to the network intermediary (the monitor proxy server or the service reverse proxy server).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network traffic monitoring system for redirecting network traffic between a client device and a cloud service, the system comprising:

a monitor proxy server configured as a network intermediary between the client device and a federated identity provider and between the client device and the cloud service, the monitor proxy server being designated by the cloud service to receive a redirected login request, the redirected login request being a login request originated from the client device and destined for the cloud service for accessing the cloud service, the login request being redirected by the cloud service to the monitor proxy server as the redirected login request wherein the redirected login request identifies the cloud service, the monitor proxy server being configured to provide, on behalf of the client device, a login credential including a password of the client device to the federated identity provider in response to the client device being redirected to the monitor proxy server by the cloud service and to receive from the federated identity provider a redirect response including an identity assertion or token generated by the federated identity provider upon user authentication, the redirect response containing a redirect web address to the cloud service, the monitor proxy server being configured to rewrite the redirect web address to the web address of the monitor proxy server, the monitor proxy server further being configured to rewrite a response web address in network communications between the cloud service and the client device to the web address of the monitor proxy server, wherein network traffic between the cloud service and the client device is routed through the monitor proxy server after user authentication by the federated identity provider.

2. The system of claim 1, wherein the monitor proxy server comprises a first reverse proxy server configured as a network intermediary between the client device and the federated identity provider, and a second reverse proxy server configured as a network intermediary between the client device and the cloud service, the first reverse proxy server being designated by the cloud service to receive a redirected login request from the client device, the first reverse proxy server being configured to provide, on behalf of the client device, a login credential of the client device to the federated identity provider in response to the client device being redirected to the first reverse proxy server by the cloud service, wherein the first reverse proxy server is configured to receive the redirect response generated by the federated identity provider upon user authentication, the redirect response containing the redirect web address to the cloud service, the first reverse proxy server is further configured to rewrite the redirect web address to the web address of the second reverse proxy server, and the second reverse proxy server is configured to rewrite a response web address in network communications between the cloud service and the client device to the web address of the second reverse proxy server.

3. The system of claim 1, wherein the client device accesses services of the cloud service on behalf of an enterprise, the enterprise employing the federated identity provider to authenticate the client device for access to the cloud service.

4. The system of claim 3, wherein the cloud service is deployed on the publicly available Internet and the monitor proxy server is installed on the publicly available Internet, on a private data network of the enterprise, or on a third party private data network.

5. The system of claim 4, wherein the client device accesses the cloud service from within or from outside of the private data network of the enterprise.

6. The system of claim 1, wherein the monitor proxy server, in response to a redirect response from the federated identity provider upon user authentication, is configured to generate a HTTP redirect to the monitor proxy server.

7. The system of claim 1, wherein the monitor proxy server receives a redirect response with an authentication token from the federated identity provider upon user authentication, the monitor proxy server is configured to encrypt the authentication token and to provide the encrypted authentication token to the client device.

8. A method in a monitor proxy server for redirecting network traffic between a client device and a cloud service, comprising:
- receiving, at the monitor proxy server, a redirected login request from the client device redirected from the cloud service, the monitor proxy server being designated by the cloud service to receive the redirected login request, the redirected login request being a login request originated from the client device and destined for the cloud service, the login request being redirected by the cloud service to the monitor proxy server as the redirected login request wherein the redirected login request identifies the cloud service;
- receiving login credentials including a password from the client device;
- forwarding the login credential including the password to a federated identity provider for authentication;
- receiving, at the monitor proxy server, a redirect response from the federated identity provider with an identity assertion or an authentication token from the federated identity provider, the redirect response containing a redirect web address to the cloud service;
- rewriting the redirect web address to the web address of the monitor proxy server;
- providing the rewritten redirect response with the authentication token to the client device;
- receiving network communications between the client device and the cloud service; and
- rewriting response web address in the network communications between the client device and the cloud service to the web address of the monitor proxy server.

9. The method of claim 8, wherein the monitor proxy server comprises a first reverse proxy server configured as a network intermediary between the client device and the federated identity provider, and a second reverse proxy server configured as a network intermediary between the client device and the cloud service, the method comprising:
- receiving at the first reverse proxy server a redirected login request from the client device redirected from the cloud service, the first reverse proxy server being designated by the cloud service to receive the redirected login request from the client device;
- receiving at the first reverse proxy server login credentials from the client device;
- forwarding the login credential to a federated identity provider for authentication;
- receiving at the first reverse proxy server a redirect response with an authentication token from the federated identity provider, the redirect response containing a redirect web address to the cloud service;
- rewriting at the first reverse proxy server the redirect web address to the web address of the second reverse proxy server;
- providing the rewritten redirect response with the authentication token to the client device;
- receiving at the second reverse proxy server network communications between the client device and the cloud service; and
- rewriting at the second reverse proxy server response web address in the network communications between the client device and the cloud service to the web address of the monitor proxy server.

10. The method of claim 8, wherein rewriting the redirect web address to the web address of the monitor proxy server comprises:
- generating, in response to the redirect response, a HTTP redirect to the monitor proxy server.

11. The method of claim 8, further comprising:
- encrypting the authentication token; and
- providing the rewritten redirect response with the encrypted authentication token to the client device.

12. The method of claim 8, further comprising:
- in response to network communications from the client device directed to the cloud service, providing the network communications to the cloud service with the authentication token, the authentication token being unencrypted or decrypted.

13. A system for redirecting network traffic between a client device and a cloud service, comprising:
- a processor configured to:
  - receive, at the processor, a redirected login request from the client device redirected from the cloud service, the processor being designated by the cloud service to receive the redirected login request, the redirected login request being a login request originated from the client device and destined for the cloud service, the login request being redirected by the cloud service to the monitor proxy server as the redirected login request wherein the redirected login request identifies the cloud service;
  - receive login credentials including a password from the client device;
  - forward the login credential including the password to a federated identity provider for authentication;
  - receive, at the processor, a redirect response from the federated identity provider with an identity assertion or an authentication token from the federated identity provider, the redirect response containing a redirect web address to the cloud service;
  - rewrite the redirect web address to the web address of a monitor proxy server;
  - provide the rewritten redirect response with the authentication token to the client device;
  - receive at the monitor proxy server network communications between the client device and the cloud service; and
  - rewrite response web address in the network communications between the client device and the cloud service to the web address of the monitor proxy server; and
- a memory coupled to the processor and configured to provide the processor with instructions.

* * * * *